(12) United States Patent
Bailleul (10) Patent No.: US 6,181,743 B1
(45) Date of Patent: Jan. 30, 2001

(54) METHOD AND DEVICE FOR MODIFYING DATA IN AN ENCODED DATA STREAM

(75) Inventor: Nicolas Bailleul, Paris (FR)

(73) Assignee: U.S. Philips Corporation, New York, NY (US)

( * ) Notice: Under 35 U.S.C. 154(b), the term of this patent shall be extended for 0 days.

(21) Appl. No.: 09/275,362

(22) Filed: Mar. 24, 1999

(30) Foreign Application Priority Data

Mar. 31, 1998 (EP) .................................................. 98400759
Apr. 3, 1998 (EP) .................................................. 98400802

(51) Int. Cl.[7] .................................................. H04N 7/12
(52) U.S. Cl. .................................................. 375/240; 382/238
(58) Field of Search .................................................. 348/416, 588, 348/589, 402, 423, 387, 465

(56) References Cited

U.S. PATENT DOCUMENTS

| | | | |
|---|---|---|---|
| 5,504,816 | * | 4/1996 | Hamilton et al. ...................... 380/20 |
| 5,537,440 | * | 7/1996 | Eyuboglu et al. ..................... 348/405 |
| 5,541,852 | * | 7/1996 | Eyuboglu et al. ..................... 348/415 |
| 5,544,266 | * | 8/1996 | Koppelmans et al. ................ 348/402 |
| 5,566,251 | * | 10/1996 | Hanna et al. .......................... 382/284 |
| 5,691,986 | * | 11/1997 | Pearlstein ............................. 348/387 |
| 5,699,124 | * | 12/1997 | Nuber et al. .......................... 348/465 |

* cited by examiner

Primary Examiner—Chris S. Kelley
Assistant Examiner—Shawn S. An
(74) Attorney, Agent, or Firm—Russell Gross (57) ABSTRACT

A basic transcoder, that decodes an encoded data stream and re-encodes it, may be used for locally modifying data in said stream. Said modification is carried out by defining a predicted data stream on the basis of a given modifying data stream and adding to the decoded stream—between the decoding and re—encoding parts of the transcoder—the difference between the modifying data stream and the predicted one. In an improved implementation, the modifying data stream is preprocessed so that it may be obtained in the decoded data stream a local substitution of said modifying data to the decoded ones.

3 Claims, 6 Drawing Sheets

METHOD AND DEVICE FOR MODIFYING DATA IN AN ENCODED DATA STREAM

FIELD OF THE INVENTION

The present invention relates to a method of modifying data in an encoded data stream corresponding to successive pictures divided into sub-pictures, comprising the steps of:
decoding said encoded data stream;
re-encoding the decoded data stream.
The invention also relates to a video processing device for carrying out said method. This invention, for instance useful when a broadcaster wants to introduce additional data such as its own logo into a sequence of pictures, finds applications not only in the field of MPEG-2compression (MEG-2 will be the common standard for TV broadcasting), but more generally in any digital video data compression system.

BACKGROUND OF THE INVENTION

In such a situation, i.e when additional digital data have to be added before transmission to an existing coded bitstream, the simplest solution is to decode said bitstream before carrying out said addition. The modified bitstream is then re-coded and transmitted. Unfortunately, a full decoding can generally be considered as expensive, as it requires a decoder and an encoder. Moreover, re-encoding with re-estimated modes and vectors may introduce artefacts on the areas left untouched by the logo addition.

SUMMARY OF THE INVENTION

It is therefore a first object of the invention to propose a low-cost solution to add data in a previously existing coded bitstream.

To this end, the invention relates to a method such as described in the opening paragraph of the description and which is moreover characterized in that it also comprises the steps of:
defining a predicted data stream on the basis of an input modifying data stream;
adding to the decoded data stream, before re-encoding it, the difference between the modifying data stream and the predicted one.

This method has for effect to convert the additional data, thanks to the mixing step, into a specific correcting signal that can then be added to the residue signal of the transcoder.

Another object of the invention is to propose an improved method for carrying out an insertion of data with an improved quality with respect to said addition of data.

To this end the invention relates to a method characterized in that it also comprises the step of preprocessing the modifying data stream in order to obtain in the decoded bitstream a substitution of said modifying data to the decoded ones.

Another object of the invention is also to propose devices for implementing the above-mentioned methods.

To this end the invention relates, in a first implementation, to a device for adding data to a video coded data stream, characterized in that it comprises:
(1) a transcoder, for decoding said data stream and re-encoding it;
(2) an addition branch, for defining:
(i) on the basis for these additional data and motion vectors defined in the transcoder, a predicted signal;
(ii) the difference between said additional data and said predicted signal, in view of an addition of said difference into said data stream between decoding and re-encoding parts of said transcoder.

The invention also relates, in a second implementation, to a device for inserting data into a video coded data stream, characterized in that it comprises:
(1) a transcoder, for decoding said bitstream and re-encoding it;
(2) an insertion branch, for defining:
(i) on the basis of these additional data a preprocessed signal;
(ii) on the basis of said preprocessed signal and motion vectors defined in the transcoder, a predicted signal;
(iii) the difference between said preprocessed additional data and said predicted signal, in view of an insertion of said difference into said bitstream between decoding and re-encoding parts of said transcoder.

In the U.S. Pat. No. 5,691,986, a method and apparatus for inserting data into an encoded data stream are described. However, in the situation as described, said stream is in fact a multiplex of elementary data streams that have to be demultiplexed in order to extract one of these elementary streams, to perform a data reduction operation on this extracted stream, and to insert said data into the reduced data stream. The present invention has a distinct object, which is either the addition of data in a picture or, in an improved embodiment, the local replacement of a part of a picture by other picture data.

BRIEF DESCRIPTION OF THE DRAWINGS

These and other aspects of the invention will be apparent from and elucidated with reference to the embodiment described hereinafter.

In the drawings.

DESCRIPTION OF THE INVENTION

Figure 1:
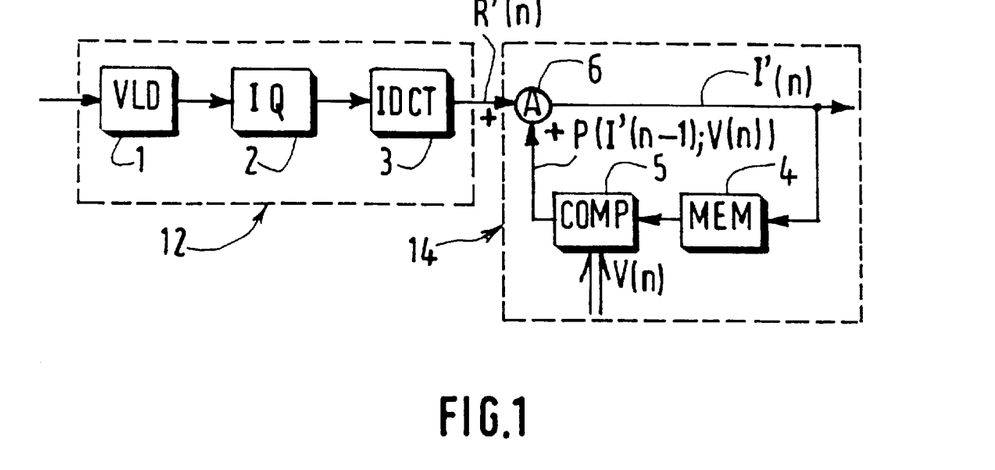
FIGS. 1 and 2 show conventional video decoder and encoder.

A conventional video decoder such as shown in FIG.1 includes a decoding channel 12, which comprises in cascade a variable length decoding circuit 1, an inverse quantizing circuit 2 and an inverse frequency transform circuit 3 (respectively: VLD, IQ, IDCT), and a motion compensation channel 14, which comprises a picture memory 4 receiving the output signals of the decoder, a motion compensation circuit 5 (said compensation taking into account the output signals of this memory 4 and motion vectors V(n) received by the decoder) and an adder 6 of the output signals of circuits 3 and 5 (respectively: MEM, COMP, A). The output picture of the decoder (also sent to the picture memory 4) is reconstructed by adding the prediction (output of circuit 5) to the decoded residual signal available at the output of the circuit 3 of the decoding channel 12.

Figure 2:
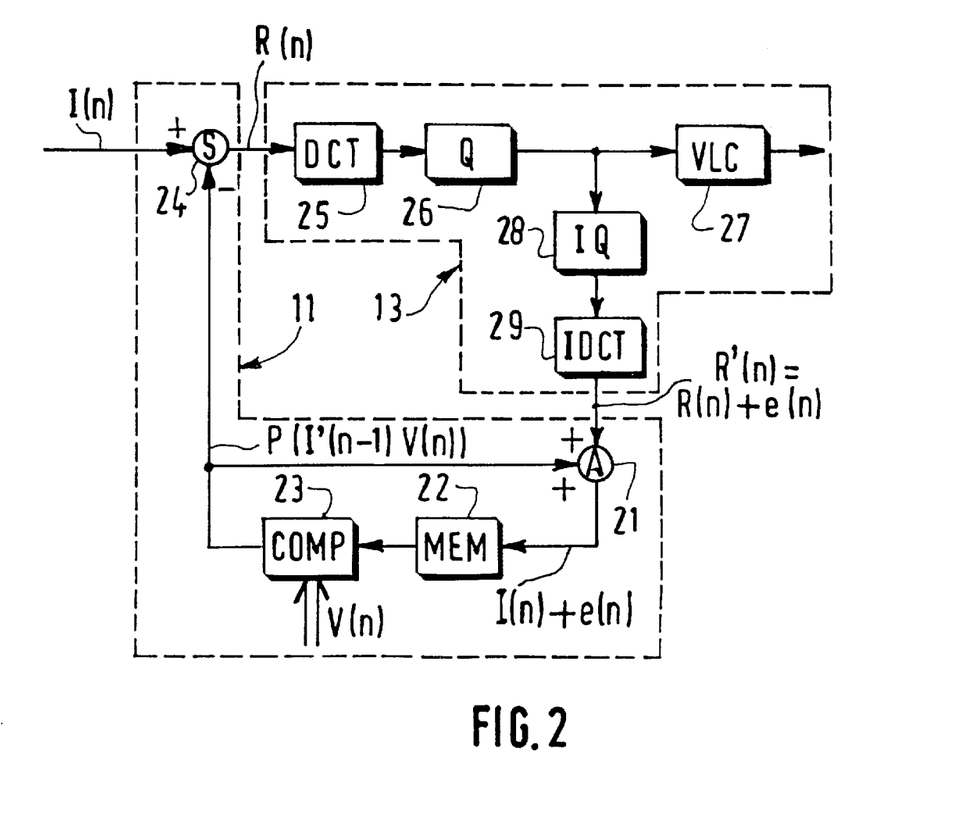

A conventional video encoder such as shown in FIG.2 includes an encoding and decoding channel 13, which comprises a discrete cosine transform circuit 25, a quantizing circuit 26, a variable length coding circuit 27 (respectively: DCT, Q, VLC) and, at the output of the circuit 26, in cascade, an inverse quantizing circuit 28 and an inverse discrete cosine transform circuit 29 (respectively:IQ and IDCT), and a prediction channel 11, allowing to subtract a motion compensated prediction from the input signal and which comprises an adder 21, for the reconstruction of the pictures before prediction, a picture memory 22, a motion compensation circuit 23 and a subtracter 24 (respectively: A, MEM, COMP, S). Said compensation takes into account previously estimated motion vectors V(n).

Figure 3:
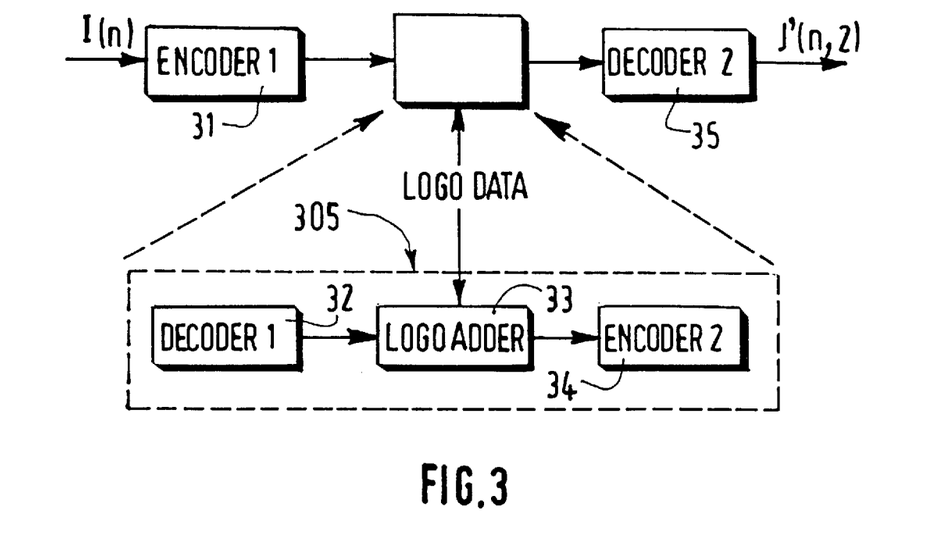
FIG.3 shows a possible scheme of a transmission chain for adding a logo to an incoming bitstream.

A possible method and a device allowing to add data such as a logo to an incoming bitstream in a transmission chain are illustrated in FIG.3. Said chain comprises a first encoder 31 (called "encoder 1"), a sub-system 305 for the addition of the logo to the coded bitstream available at the output of the encoder 31, and, after transmission, a decoder 35 ("decoder 2"). The sub-system provided between said encoder and decoder, itself comprises, as illustrated, a decoder 32 ("decoder 1"), a logo adder 33 and an encoder 34 ("encoder 2"). Then, starting from said decoder 32 and said encoder 34 and taking advantage of their complementarity, some simplifications will be made, in order to finally reach the outline of the transcoder according to the invention.

According to FIG.2, one has indeed, for the first encoder 31:

$$R(n, 1)=I(n)-P(I'(n-1), 1; V(n)) \quad (1)$$

where the index (,1) in R(.) and P(.) designates the "first" encoder 31 (=encoder 1), I(n) is the original video input of the encoder, P(I'(n-1), 1; V(n)) is the prediction signal computed by applying motion vector V(n) to the previously "decoded" picture I'(n-1) and which has to be subtracted from the original input bitstream I(n) in order to obtain the residual signal R'(n) to be coded, and R(n) designates this residual signal. It must be noted that the signal R'(n) available at the input of the prediction channel of the encoder differs from R(n) by a value e(n) called the coding error; R'(n) being equal to R(n)+e(n), the signal at the output of the adder of this prediction channel is therefore I'(n)=I(n)+e(n).

For the first decoder 32 that follows the encoder 31, one has similarly, according to FIG. 1:

$$I'(n,1)=R'(n,1)+P(I'(n-1), 1; V(n)) \quad (2)$$

where the index (,1) in I'(.), R'(.) and P(.) designates the "first" decoder 32, R'(n) is the decoded residual signal, P(I'(n-1), 1; V(n)) is the prediction to be added to R'(n), and I'(n) designates the output of the decoder. As seen above, I'(n,1) may also be written in the form:

$$I'(n, 1)=I(n)+e(n, 1)$$

that is to say, the output of the decoder is the sum of the original input signal I(n) and of the coding error e(n) during the coding operation of I(n). At the output of the logo adder 33, one has consequently:

$$J'(n,1)=I'(n,1)+Logo(n) \quad (3)$$

where I'(n) is the output of the decoder 32 and Logo(n) the data (for instance, a logo) to be added to the main bitstream. The resulting output J'(n) is sent towards the encoder 34.

For this second encoder 34, one has (similarly to the previous case of the first encoder 31):

$$R(n,2)=J'(n,1)-P(J'(n-1), 2; V(n)) \quad (4)$$

where the index (,2) in R(.) and P(.) now designates this "second" encoder 34, P(J'(n-1),2 ; V(n)) is the prediction which has to be subtracted from the output J'(n-1) of the logo adder 33 in order to obtain the residual signal that has to be coded, and R(n) designates said residual signal.

Finally, for the second decoder 35, one has (similarly to the previous case of the first decoder 32):

$$J'(n,2)=R'(n,2)+P(J'(n-1), 2; V(n)) \quad (5)$$

where the index (,2) in J'(.), R'(.) and P(.) now designates this "second" decoder 35, R'(n) is the decoded residual signal, P(J'(n-1), 2; V(n)) is the prediction to be added to R'(n), and J'(n) designates the output of the decoder. As for the decoder 32, J'(n,2) may be also be written in the form:

$$J'(n,2)=J'(n,1)+e(n,2)$$

$$J'(n,2)=I'(n,1)+Logo(n)+e(n,2)$$

$$J'(n,2)=I(n)+e(n,1)+Logo(n)+e(n,2) \quad (6)$$

which means that the output signal J'(n,2) of the transmission chain is indeed equal to the sum of the original input signal I(n), of the first coding error (coding/decoding in the first encoder and decoder), of the second coding error (coding/decoding in the second encoder and decoder), and of the additional data.

Then, using the linearity of the motion compensation operator, it may be written:

$$P(J'(n-1), 2; V(n))=P[((J'(n-1), 1)+(e(n-1), 2));V(n)] \quad (7)$$

which allows to write the relation (4) in the form:

$$R(n,2)=J'(n,1)-P[((J'(n-1), 1)+(e(n-1), 2));V(n)] \quad (8)$$

Using again the linearity of the compensation operator, one has:

$$P(J'(n-1), 1; V(n))=P[(I'(n-1)+Logo(n-1)), 1; V(n)]$$

or:

$$P(J'(n-1), 1; V(n))=P(I'(n-1), 1; V(n))+P(Logo(n-1), 1; V(n)) \quad (9)$$

Therefore the relation (8) becomes:

$$R(n,2)=I'(n,1)+Logo(n)-P(e(n-1),2 ; V(n))$$

$$-P(I'(n-1), 1; V(n))-P(Logo(n-1), 1; V(n)) \quad (10)$$

or, from the relation (2):

$$R(n,2)=R'(n-1)-P(e(n-1),2; V(n))$$

$$+Logo(n)-P(e(n-1),2; V(n))$$

$$-P(I'(n-1), 1; V(n))-P(Logo(n-1), 1; V(n)) \quad (11)$$

which finally leads to the following relation (12):

$$R(n,2)=R'(n-1)-P(e(n-1), 2; V(n))$$

$$+Logo(n)-P(Logo(n-1); V(n)) \quad (12)$$

which is the final system equation of the transcoder with logo adder as proposed according to the invention.

Figure 4:
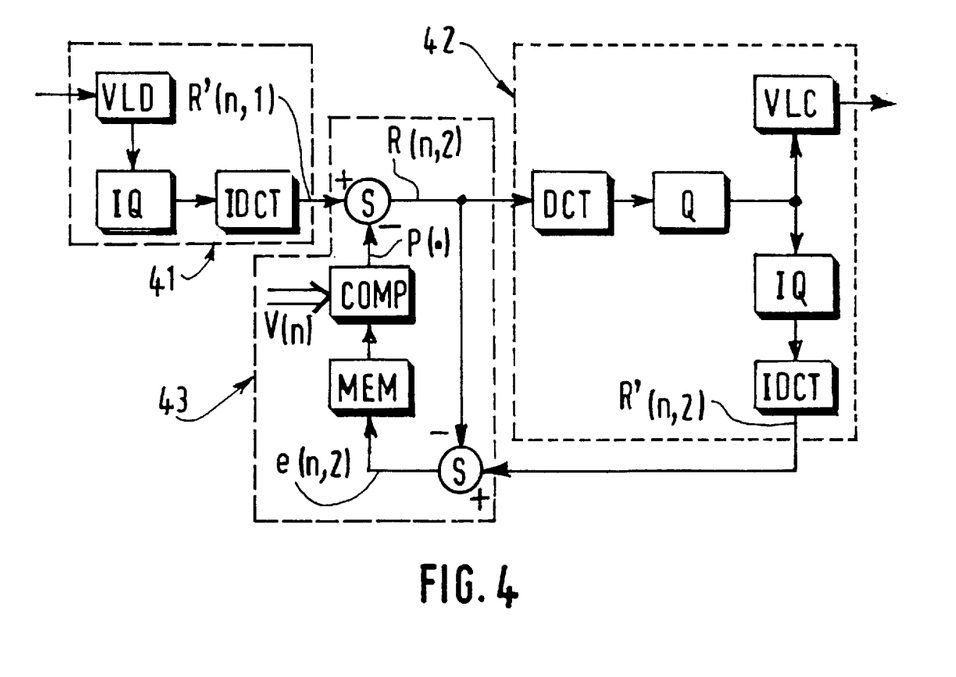
FIG.4 illustrates the outline of a known transcoder, without logo adder.
Figure 5:
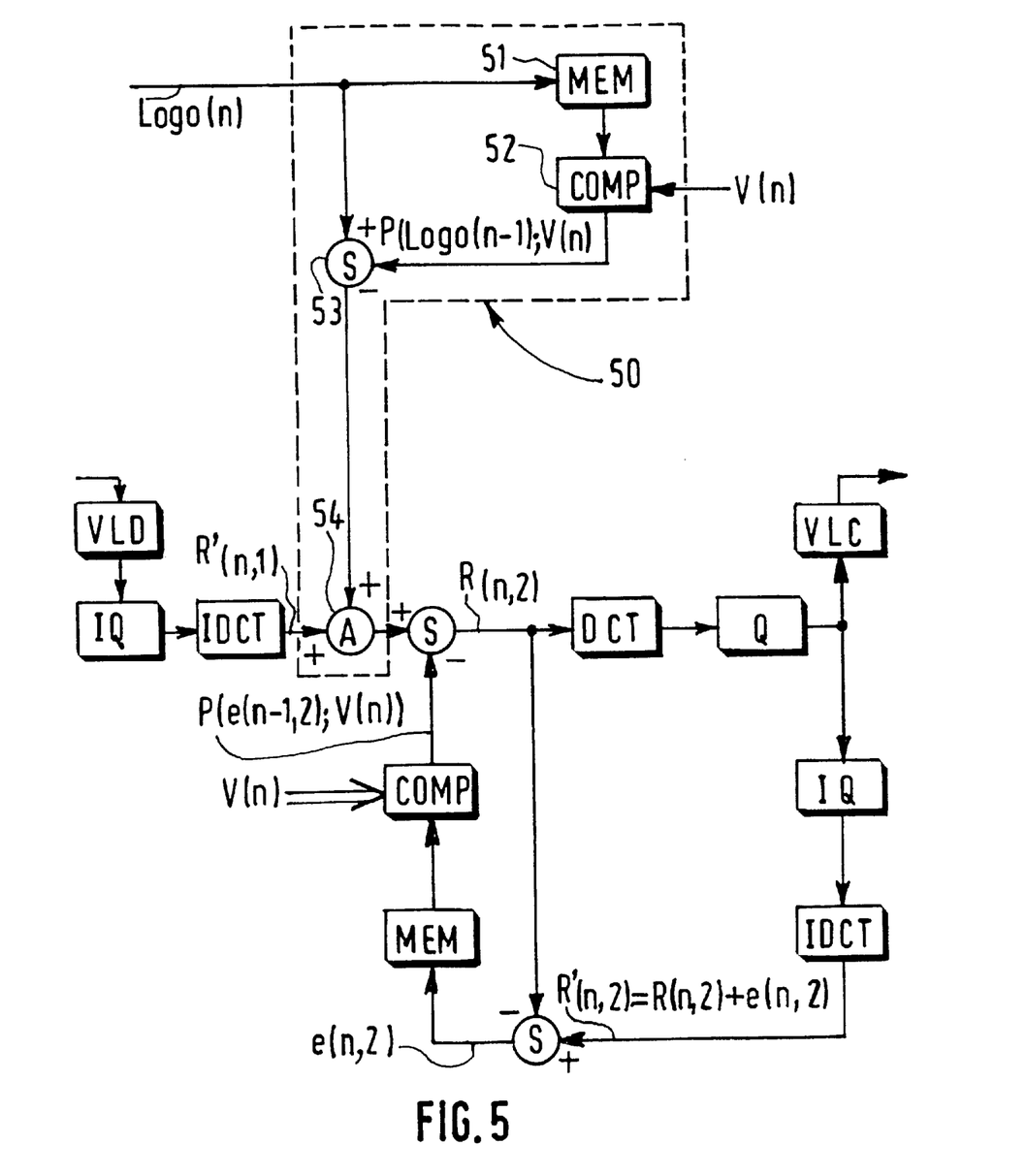
FIG.5 illustrates such a transcoder when it is, according to the invention; provided with a logo adder.

The general outline of the transcoder without logo adder is first recalled in FIG.4 (for comparison with FIG.5). It comprises a residue decoding branch 41 (variable length decoding VLD+inverse quantization IQ+inverse discrete cosine transform IDCT), an encoding and decoding branch 42 (discrete cosine transform DCT+quantization Q+variable length coding VLC; inverse quantization IQ+inverse discrete cosine transform IDCT), and an intermediary branch called a pseudo-prediction branch 43 (first subtracter S +memory MEM+motion compensation COMP on the basis of motion vectors V(n)+second subtracter S). This branch 43 is so called because it is not exactly a classical prediction as in a basic encoder, the first adder being here replaced by a subtracter. The signals R'(n,1), R(n,2), R'(n,2), e(n,2), V(n), P(e(n-l), 2 ; V(n)) previously cited are shown in FIG.4.

The corresponding scheme of the transcoder according to the invention—i.e. with a logo adder—is then illustrated in FIG.5 where, in comparison with FIG.4, the identical parts are designated in the same manner. The additional part is a logo addition branch 50 that includes a memory MEM 51, receiving the logo to be added (signal Logo(n)), a motion compensation circuit COMP 52, receiving the output of the memory 51 and the vectors V(n) and delivering a predicted data stream, a subtracter S 53, for delivering the difference between the original signal Logo(n) and the motion compensated one P(Logo(n-l) ; V(n)) available at the output of the circuit 52 (predicted data stream), and an adder 54, for introducing the output signal of said subtracter 53 into the main bitstream (corresponding to the complete sequence of successive pictures). The logo addition is therefore implemented by means of a residue addition to the incoming bitstream, and this residue is formed by subtracting logo with a motion compensated logo prediction that is based on reference pictures containing logo previously stored and that uses the same modes and vectors as the main incoming bitstream.

The method and device hereabove described may be further improved. It is indeed contemplated no longer to add, but to insert additional data (such as a logo) into the main video bitstream, without modifying the other parts of the picture.

Such an insertion of data, i.e. the replacement of an area of a picture (or sequence of pictures) by said data— is a non—linear processing that requires a full access to the original pixels (=picture elements). For a high quality logo insertion, a full decoding of the incoming bitstream should therefore be performed. According to the invention, such a full decoding is replaced by a low-cost rough decoding (here described in the case of the MPEG-2 standard).

Figure 6:
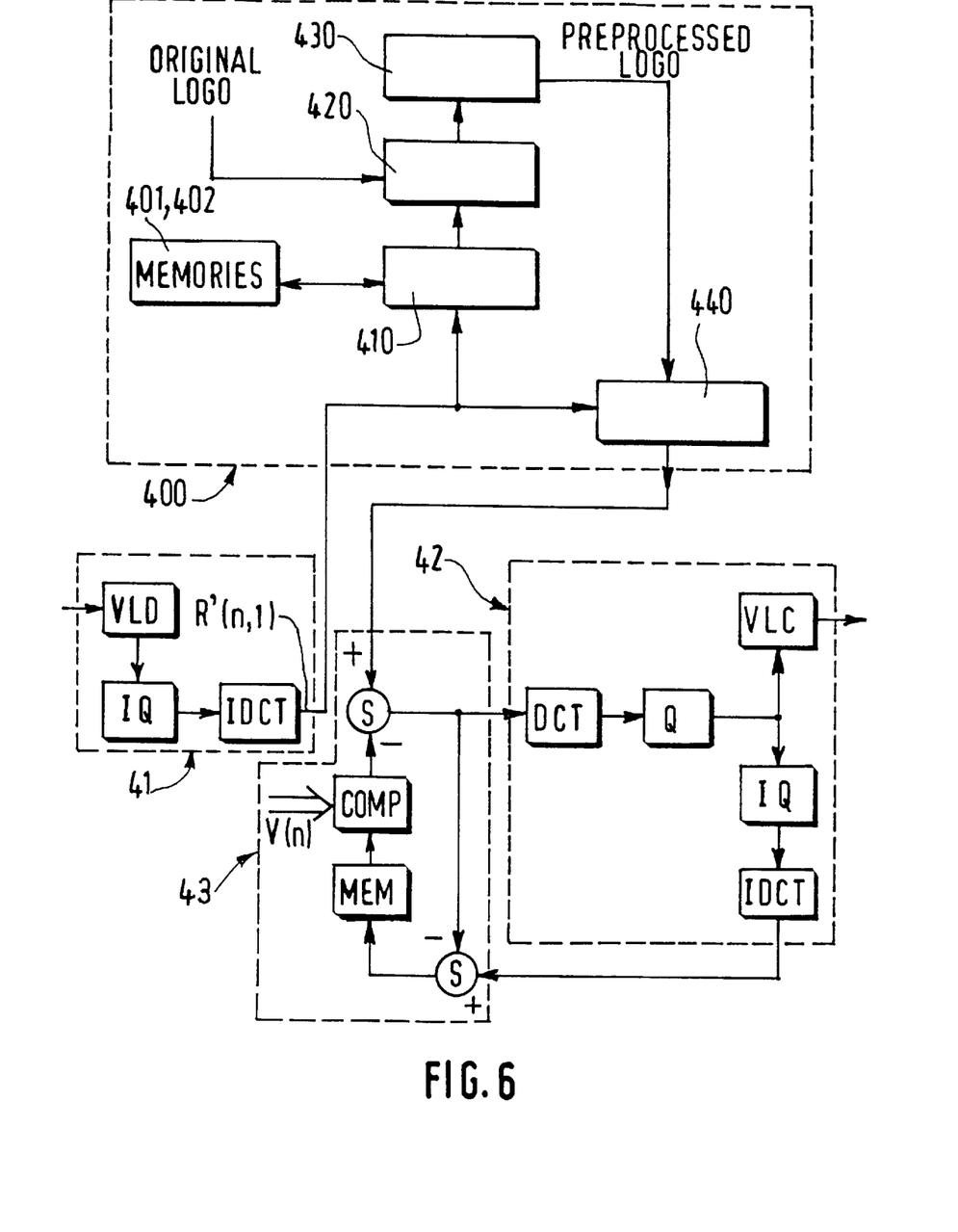
FIG.6 also illustrates such a transcoder, but when it is, according to the invention, provided with a logo insertion device.

The corresponding scheme of the transcoder according to the invention—i.e. with a logo inserter—is illustrated in FIG.6 where, in comparison with FIG.4, the identical parts are designated in the same manner. The additional part (with respect to FIG.4) is a logo insertion device 400 that will be now described in a detailed manner.

Figure 7:
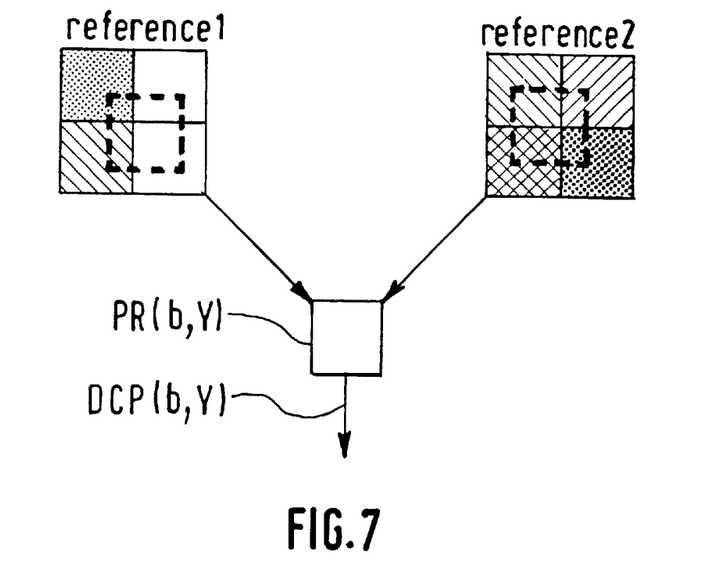
FIG.7 illustrates a computation made in said logo insertion device.

In this logo insertion device, four steps are implemented. The first one is a so-called DC estimation step, carried out in an estimation stage 410. Each picture of an MPEG sequence is subdivided into motion compensation units called macroblocks. Moreover, in MPEG standard, three types of pictures are considered: I (or intra) pictures, coded without any reference to other pictures, P (or predicted) pictures, coded with reference to a past picture (I or P), and B (or bidirectionally predicted) pictures, coded with reference to a past and a future picture (I or P). These I and P pictures will be called reference frames. In the stage 410, the average value of each macroblock is estimated according to the average values of the reference frames (previously stored in associated buffer memories 401 and 402) and to the current average value of the incoming residue (the signal referenced R'(n,1) in FIG.4). If DCP(b,Y) designates the average value of the prediction PR(b,Y) for the macroblock b in the component Y (an illustration of such a computation is given in FIG.7 in the case of an interpolated macroblock : the macroblock in each of the two reference pictures and the prediction PR(b,y) and its average value DCP(B,Y) are shown), if ACR(b,Y) designates the average value of the residue (i.e. of the signal called R'(n,1) at the output of the residue decoding branch 41 of the transcoder) for the same macroblock in the same component Y, and if MDC(b,Y) designates the estimated average value of the same macroblock b in the same component Y, then one has:

$$MDC(b,Y)=DCP(b,Y)+ACR(b,Y) \quad (13)$$

The description is given in the case of the component Y, but it would be the same with anyone of the chrominance components U,V in place of the luminance Y.

It may be observed that no noticeable drift may occur on such estimations if it is assumed that the incoming bitstream, at the input of the transcoder, presents a standard broadcasting GOP duration (e g. N=12) allowing prediction pictures to be refreshed often enough on intra pictures (a GOP, or Group Of Pictures, consists of an I picture and all succeeding pictures until the next I picture, itself not included, and N is therefore defined as the size of the GOP, the most common one in MPEG standard being N=12).

The second step is a logo processing one, carried out in a processing stage 420. A processing of the logo pixel values is indeed performed in order to keep visibility and conformance of the logo whatever the picture content. It is in fact wanted to have:

$$MV(CP)+MV(Logo(CP))=RQM(CP) \quad (14)$$

where CP designates the luminance component Y or anyone of the chrominance components (U,V), MV(CP) is the average value of the original area where the logo has to be inserted in the component CP (these values are estimated according to the relation (13) indicated above), MV(Logo (CP)) is the average value of the processed logo, and RQM(CP) corresponds to the required average value of the picture after logo insertion, in the logo area. The pixel values Logo(b, CP) of the logo to be inserted at the macroblock b are therefore defined, after logo processing, by the relation (15):

$$Logo(b, CP)=Logo\_ori(b, CP)+RQM(CP)$$
$$-MV(CP)-MV\_Logo\_ori(CP) \quad (15)$$

where Logo_ori(b, CP) designate the original pixel values of the logo to be inserted at the macroblock b, and MV_Logo_ori(CP) designates the average value of the original logo in the component CP.

Figure 8:
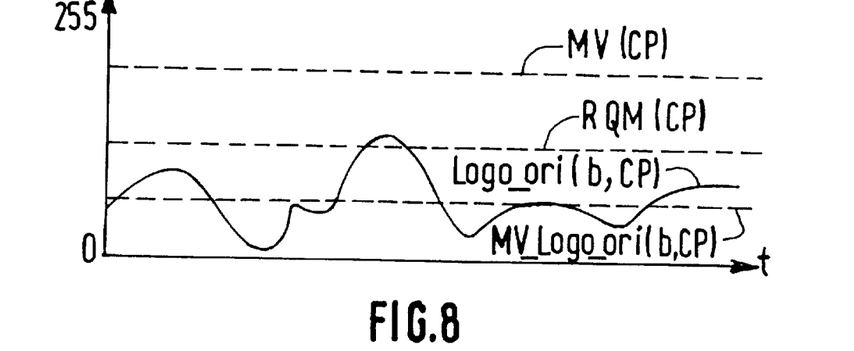
FIGS.8 to 10 illustrate the processing carried out on the luminance and chrominance components, and FIGS. 11 and 12 a logo clipping carried out after said processings.
Figure 9:
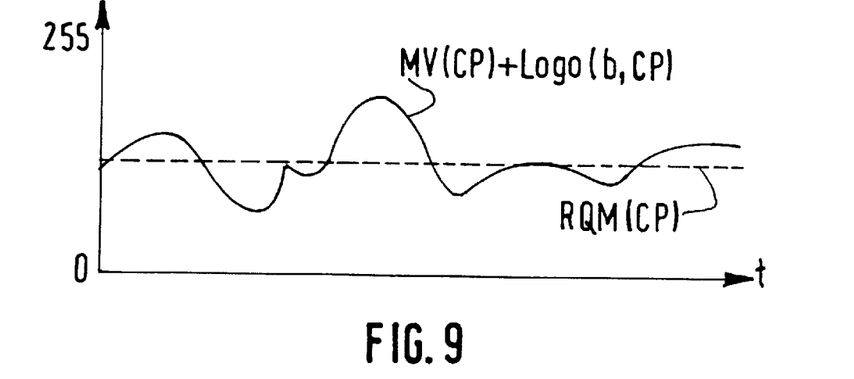
Figure 10:
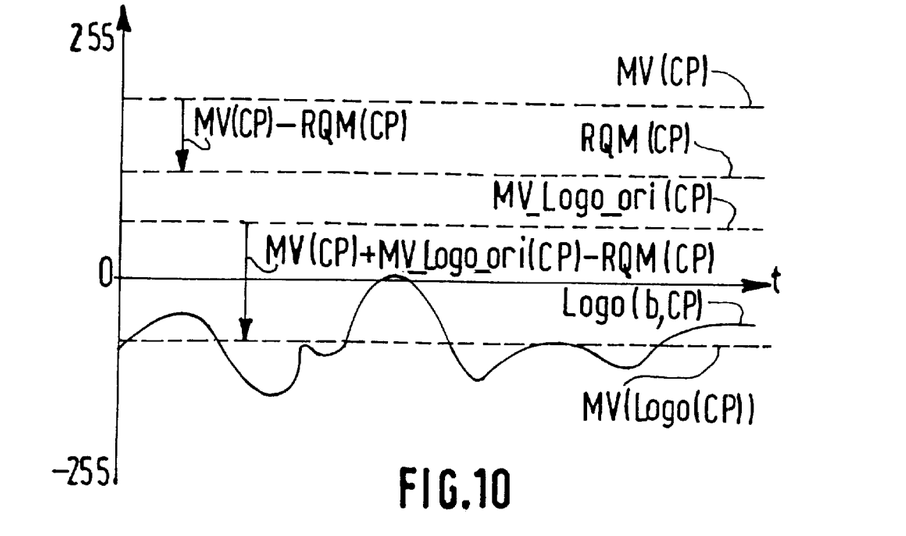

This logo processing is illustrated in FIGS.8 to 10 : FIG.8 shows the original logo signal Logo_ori(b, CP) before insertion, its average value MV_Logo_ori(CP), RQM(CP), and MV(CP), while FIG.9 shows what is required (MV (CP)+Logo(b, CP)=RQM(CP) and FIG.10 illustrates the principe of the adaptation carried out to obtain the required result (as indicated, a shift of the logo signal of a value equal to (MV(CP)−RQM(CP))+MV_Logo_ori(CP)).

For chrominance components, logo conformance to the original logo is required, i.e. the insertion of the processed logo into the picture must lead to the colors of the original logo. For the chrominance components U and V, RQM(CP) is therefore MV_Logo_ori(CP). For luminance, a choice can be made between either preferring conformance to the original (i.e. RQM(Y)=MV$_{13}$ Logo$_{13}$ ori(Y)) or visibility (so that the logo appears dark in bright areas and vice-versa). In this last case, RQM(Y)=128.

The third step is a logo clipping one, carried out in a clipping stage 430. According to the MPEG-2 standard, at the decoder side the reconstructed pictures stored in memories are clipped between 0 and 255. To do the same at the encoder side cannot be achieved since a complete decoding of the incoming bitstream is not performed. The clipping step is then performed on a macroblock basis. The right pixel values are not known, but this situation is compensated by taking a margin MG on the clipping. Then, for each component Y, U or V (always called CP), Logo(b, CP) is clipped so that:

$$O+MG<MV(b,CP)+Logo(b,CP)<255-MG \quad (16)$$

which gives:

$$MG-MV(b, CP)<Logo(b, CP) \quad (17)$$

$$Logo(b, CP)<255-MG-MV(b, CP) \quad (18)$$

Figure 11:
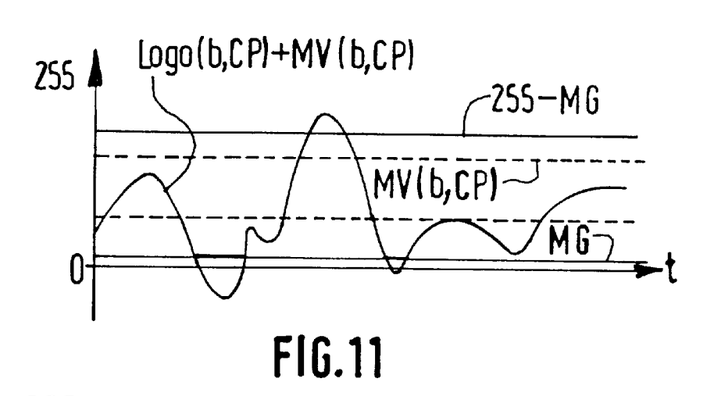
Figure 12:
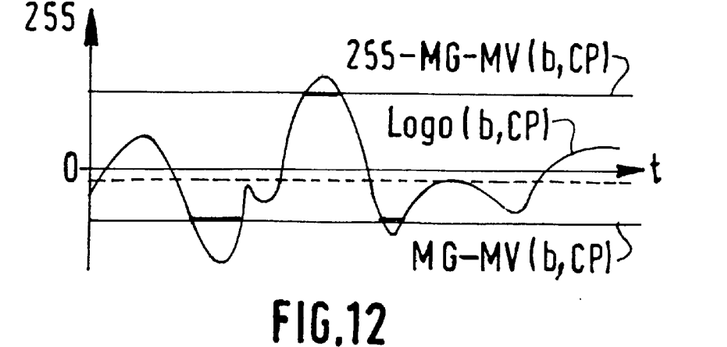

This logo clipping is illustrated in FIGS. 11 and 12, where FIG. 11 allows to represent MV(b, CP), MV(b, CP)+Logo (b, CP), and the clipping limits MG and 255 −MG, and therefore illustrates the relation (16), while FIG. 12 illustrates similarly the relations (17) and (18).

The fourth step is a logo addition one, carried out in a logo addition stage 440 that is identical to the logo addition branch 50 shown in FIG.5. Said stage 440 comprises a memory receiving the clipped logo available at the output of the clipping stage 430, a motion compensation circuit receiving the output of said memory and the vectors V(n) defined in the transcoder, a subtracter (for delivering the difference between the clipped logo, available at the output of the preprocessing part of the logo insertion device 400, and the motion compensated one available at the output of said motion compensation circuit) and an adder (for inserting the output signal of said subtracter into the main bitstream). These four elements (memory, motion compensation circuit, subtracter, adder) are similar to the four elements 51 to 54 of FIG.5. The logo insertion is therefore implemented by means of a residue addition to the incoming bitstream, and this residue is formed by defining the difference between the logo (preprocessed as described) and a motion compensated prediction derived from said preprocessed logo and that uses the same motion vectors as the main incoming bitstream.

What is claimed is:

1. A method of modifying data in an encoded data stream corresponding to successive pictures divided into sub-pictures, comprising the steps of:
   decoding said encoded data stream;
   re-encoding the decoded data stream;
   defining a predicted data stream on the basis of an input modifying data stream;
   adding to the decoded data stream, before re-encoding it, the difference between the modifying data stream and the predicted one;
   wherein a pseudo-prediction sub-step is provided between said decoding and re-encoding steps, said sub-step comprising in series the following operations:
      a definition operation of a coding error appeared during the re-encoding step;
      a motion compensation operation on the basis of motion vectors previously determined for each respective sub-picture and applied to said coding error;
      a subtracting operation defining a residual signal by difference between the decoded data stream and the output stream of the motion compensation operation; said method being characterized in that said definition step comprises the operations of:
      storing the modifying data stream;
      compensating motion on the basis of said motion vectors applied to said stored data stream;
   subtracting from the modifying data stream the predicted data stream available after said motion compensation operation.

2. A method of modifying data in an encoded data stream corresponding to successive pictures divided into sub-pictures, comprising the steps of:
   decoding said encoded data stream;
   re-encoding the decoded data stream;
   defining a predicted data stream on the basis of an input modifying data stream;
   adding to the decoded data stream, before re-encoding it, the difference between the modifying data stream and the predicted one;
   wherein the method also includes:
      preprocessing the modifying data stream in order to obtain in the decoded data stream a substitution of said modifying data to the decoded ones.

3. A method according to claim 2, in which a pseudo-prediction sub-step is provided between said decoding and re-encoding steps, said sub-step comprising in series the following operations:
   a definition operation of a coding error appeared during the re-encoding step;
   a motion compensation operation on the basis of motion vectors previously determined and applied to said coding error;
   a subtracting operation defining a residual signal by difference between the decoded data stream and the output stream of the motion compensation operation; said method being characterized in that said preprocessing step includes the operations of:
   estimating the average values of all the sub-pictures of the current picture corresponding to said data stream;
   preprocessing the additional data in order to keep visibility and conformance of the additional data whatever the picture content is;
   clipping said preprocessed additional data on a macroblock basis.

* * * * *